Feb. 22, 1949.  J. BAUER ET AL  2,462,350
HEIGHT GAUGE
Filed Sept. 20, 1945
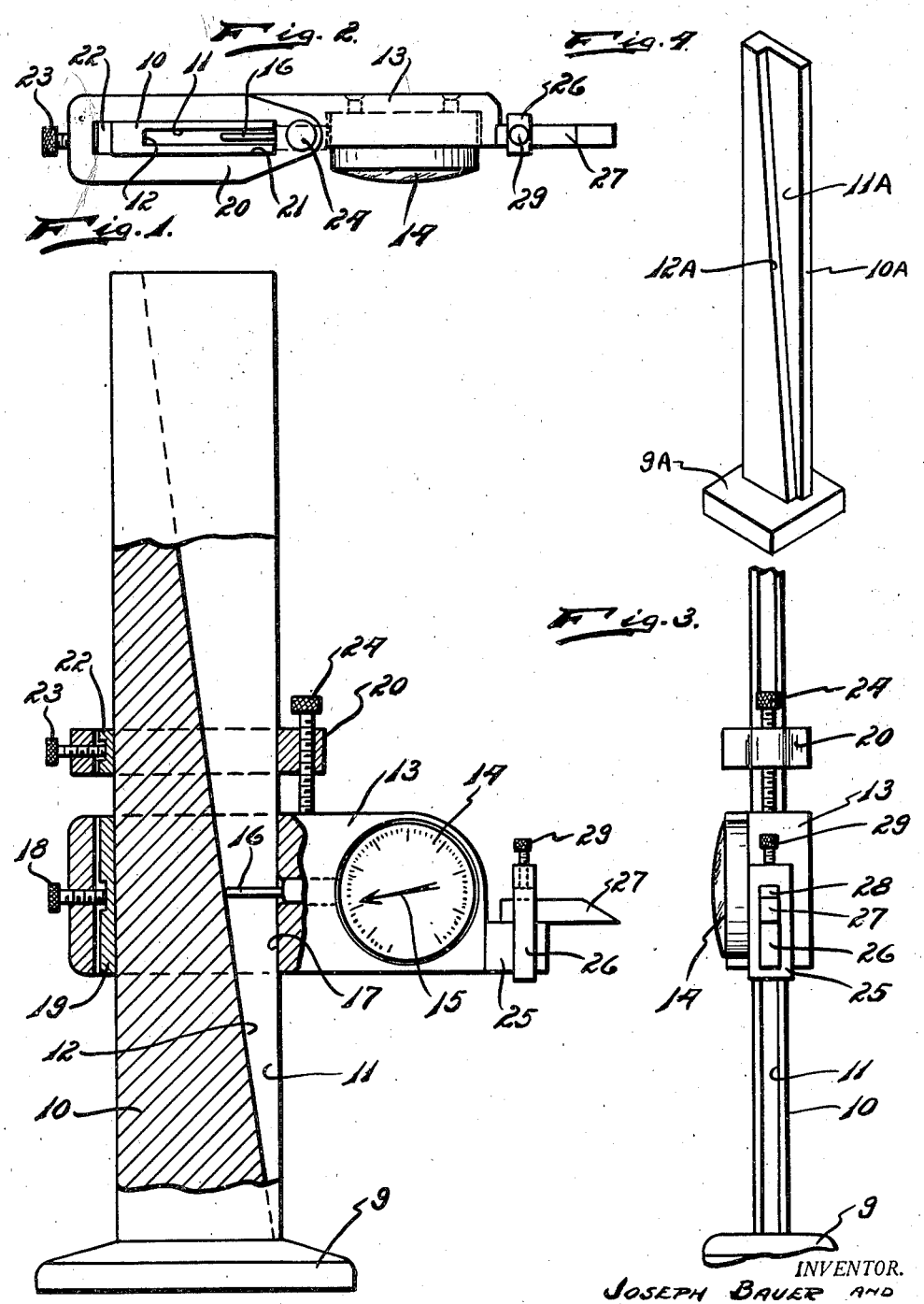
INVENTOR.
JOSEPH BAUER AND
ANTHONY SCHITTELBAUER
BY
Thos. L. Donnelly
ATTORNEY Patented Feb. 22, 1949

2,462,350

UNITED STATES PATENT OFFICE 2,462,350

HEIGHT GAUGE

Joseph Bauer and Anthony Schittelbauer, Detroit, Mich.

Application September 20, 1945, Serial No. 617,572

7 Claims. (Cl. 33—169)

Our invention relates to a new and useful improvement in a gauge adapted for use in indicating dimensions and measuring various objects. The invention lends itself admirably for use as a caliper, height gauge or the like.

It is an object of the invention to provide a gauge whereby the contacting finger is permitted to travel over an inclined surface and the distance of travel over the inclined surface will be indicated by an indicating gauge.

Another object of the invention is the provision of a gauge of this class which wil be simple in structure, economical of manufacture, durable, compact, accurate and highly efficient in use.

Another object of the invention is the provision of a gauge in which a carriage is slidably mounted on a supporting bar and so arranged that it may be moved longitudinally thereof to a predetermined distance and then moved gradually by threaded means from such pre-determined distance.

Another object of the invention is the provision of a measuring carriage slidably mounted on a bar or supporting standard and having an inclined surface engaging with the indicating member so that the degree of longitudinal movement of the carriage on the bar will be indicated by an indicating gauge.

Other objects will appear hereinafter.

It is recognized that various modifications and changes may be made in the detail of structure illustrated and it is intended that such shall be embraced within the scope of the claims which form a part hereof.

Forming a part of this application are drawings in which,

Fig. 1 is a side elevational view of the invention with parts broken away and parts shown in section, Fig. 2 is a top plan view of the invention, Fig. 3 is a front elevational view of the invention, Fig. 4 is a perspective view of the supporting bar used in the invention, showing a slight modification.

While the invention is adapted for use as a measuring instrument for various measuring operations in the drawings I have indicated it applied to a height gauge. In the drawings I have indicated a base 9 projecting upwardly from which is a standard or bar 10 having a groove 11 formed in one of its faces provided with the inclined base 12 which serves as the contacting surface. The carriage 13 is provided with an opening 17 through which the bar or standard 10 may be projected. Mounted on this carriage 13 is a dial 14 for cooperation with an indicating pointer 15 actuated by the contact finger or plunger 16. The parts 14, 15 and 16 may be of any well known construction as indicating dials are commonly used and the dial itself forms no part of the present invention. In indicating dials of this class, the longitudinal movement of the plunger 16 effects a rotation of the pointer 15 and the plunger 16 is normally spring pressed outwardly. Threaded into the carriage 13 is a set screw 18 which serves to press the presser plate 19 against the bar or standard 10 for locking the carriage 13 in fixed relation to the member 10. Slidably embracing the bar or standard 10 is a sleeve 20 having the opening 21 therethrough through which the bar or standard 10 is slidably projected. The presser plate 22 is pressed by the set screw 23 into plunging engagement with the member 10 so that the sleeve may be locked in fixed relation on the standard or bar 10. Threaded through the member 20 is a screw 24 which swivelly connects to the carriage 13.

Carried by and projecting outwardly from the carriage 13 is a supporting bar 25 embracing which is a yoke 26. A contact plate 27 is positioned on the upper surface of the member 25 and embraced by the yoke 26. A presser plate 28 against which may be threaded the set screw 29 is used to clamp the member 27 in fixed relation on the member 25.

The description of the operation of the invention as used as a height gauge will, it is believed, also indicate the method of operation of this invention when used for other purposes.

In use the set screws 18 and 23 would be loosened and the carriage 13 as well as the sleeve 20 would be slid longitudinally of the standard or bar 10 to approximately the distance desired and this distance of slidable movement will be indicated on the dial 14 as the plunger 16 rides inwardly or outwardly. When this approximate location has been reached the set screw 23 will be tightened so as to securely lock the sleeve 20 in fixed relation on the member 10. By rotating the screw 24 a fine adjustment or movement of the carriage 13 may be effected. When desired the carriage 13 may also be locked in position by tightening the set screw 18.

In Fig. 4, I have illustrated a modified type of structure. The standard 10A which projects upwardly from the base 9A is cut away as at 11A to provide the inclined contact face 12A. This structure is illustrated instead of the groove construction shown in Fig. 1.

With a gauge constructed in this manner the movement of the contacting member 27 longitudinally of the bar 10 is indicated on the dial by virtue of contact plunger 16 riding over an inclined surface. Experience has shown that a gauge of this type is most accurate and is one which may be adapted to various purposes and easily and particularly quickly operated.

What we claim as new and desire to secure by our Letters Patent is:

1. A gauge of the class described comprising an elongated bar having a groove formed in one of its faces extending longitudinally thereof and provided with an inclined bottom; a carriage slidably mounted on said bar; an indicating dial carried by said carriage; a spring pressed plunger for operating said indicating dial and extending into said groove and riding with one end in contact with said inclined bottom.

2. A gauge of the class described comprising an elongated bar having a groove formed in one of its faces extending longitudinally thereof and provided with an inclined bottom; a carriage slidably mounted on said bar; an indicating dial carried by said carriage; a spring pressed plunger for operating said indicating dial and extending into said groove and riding with one end in contact with said inclined bottom; and a contact member carried by said carriage.

3. A gauge of the class described comprising an elongated bar having a groove formed in one of its faces extending longitudinally thereof and provided with an inclined bottom; a carriage slidably mounted on said bar; an indicating dial carried by said carriage; a spring pressed plunger for operating said indicating dial and extending into said groove and riding with one end in contact with said inclined bottom; and a contact member carried by said carriage; means for locking said carriage in fixed relation on said bar.

4. A gauge of the class described comprising an elongated bar having a longitudinally extending groove formed in one of its faces and provided with an inclined base; a sleeve slidably mounted on said bar; means for locking said sleeve against slidable movement on said bar; a carriage slidably mounted on said bar; an indicating dial carried by said carriage; an indicating mechanism associated with said dial; a spring pressed plunger for operating said indicating mechanism and extending into said groove and riding with one end in contact with the inclined base of said groove; a contact member carried by said carriage; and threaded means for connecting said carriage to said sleeve for, upon rotation, moving said carriage longitudinally of said bar and relatively to said sleeve.

5. A gauge of the class described comprising an elongated bar having a longitudinally extending groove formed in one of its faces and provided with an inclined base; a sleeve slidably mounted on said bar; means for locking said sleeve against slidable movement on said bar; a carriage slidably mounted on said bar; an indicating dial carried by said carriage; an indicating mechanism associated with said dial; a spring pressed plunger for operating said indicating mechanism and extending into said groove and riding with one end in contact with the inclined base of said groove; a contact member carried by said carriage; and threaded means for connecting said carriage to said sleeve for, upon rotation, moving said carriage longitudinally of said bar and relatively to said sleeve; and means for locking said carriage in fixed relation to said bar.

6. A gauge of the class described, comprising: an elongated bar having on one of its sides a longitudinally inclined face; a carriage slidably mounted on said bar; an indicating dial carried by said carriage; a spring pressed plunger for operating said indicating dial and riding with one of its ends in contact with said inclined face.

7. A gauge of the class described, comprising: an elongated bar having on one of its sides a longitudinally inclined face; a carriage slidably mounted on said bar; an indicating dial carried by said carriage; a spring pressed plunger for operating said indicating dial and riding with one of its ends in contact with said inclined face; a contact member carred by said carriage; and means for locking said carriage in fixed relation on said bar.

JOSEPH BAUER.
ANTHONY SCHITTELBAUER.

No references cited.